(12) United States Patent
Peterson

(10) Patent No.: US 7,950,721 B1
(45) Date of Patent: May 31, 2011

(54) TRUCK SKIRTING

(76) Inventor: Larry William Peterson, Moline, IL (US)

( * ) Notice: Subject to any disclaimer, the term of this patent is extended or adjusted under 35 U.S.C. 154(b) by 147 days.

(21) Appl. No.: 12/334,222

(22) Filed: Dec. 12, 2008

(51) Int. Cl.
*B60J 9/00* (2006.01)

(52) U.S. Cl. .................................................. 296/180.4

(58) Field of Classification Search ............... 296/180.4, 296/180.1; 180/116, 127; 52/DIG. 3, 169.12; 280/432, 768, 849
See application file for complete search history.

(56) References Cited

U.S. PATENT DOCUMENTS

| | | | | |
|---|---|---|---|---|
| 2,340,628 A * | 2/1944 | Theriault | ...................... | 280/837 |
| 3,608,928 A * | 9/1971 | Hooker | .......................... | 280/768 |
| 3,722,156 A * | 3/1973 | Bryant | ....................... | 52/169.12 |
| 4,010,963 A * | 3/1977 | Prentice | ........................... | 280/768 |
| 4,601,508 A * | 7/1986 | Kerian | ....................... | 296/180.4 |
| 4,611,847 A * | 9/1986 | Sullivan | ....................... | 296/180.2 |
| 4,877,266 A * | 10/1989 | Lamparter et al. | ............. | 280/762 |
| 4,909,154 A * | 3/1990 | Walker et al. | ................... | 105/1.1 |
| 4,996,807 A * | 3/1991 | Walgamuth | ................. | 52/169.12 |
| 5,094,503 A * | 3/1992 | Dare-Bryan | ............... | 296/180.1 |
| 5,280,990 A * | 1/1994 | Rinard | ........................ | 296/180.1 |
| D354,726 S * | 1/1995 | Fitzgerald et al. | ........... | D12/181 |
| 5,690,305 A * | 11/1997 | Perkins | ........................... | 248/200 |
| 5,788,321 A * | 8/1998 | McHorse et al. | .......... | 296/180.1 |
| 5,921,617 A * | 7/1999 | Loewen et al. | .............. | 296/180.4 |
| 6,257,655 B1 * | 7/2001 | Selby et al. | ................. | 296/186.2 |
| 6,428,084 B1 * | 8/2002 | Liss | ............................. | 296/180.3 |
| D468,671 S * | 1/2003 | Tampi | ........................... | D12/190 |
| 6,644,720 B2 * | 11/2003 | Long et al. | .................. | 296/180.4 |
| 6,712,424 B2 * | 3/2004 | Swain | ......................... | 296/180.1 |
| 6,742,616 B2 * | 6/2004 | Leban | ............................ | 180/116 |
| 6,807,735 B2 * | 10/2004 | Crean | ............................ | 29/897.2 |
| D499,679 S * | 12/2004 | Perfetti et al. | ............... | D12/196 |
| 6,846,035 B2 * | 1/2005 | Wong et al. | .................. | 296/180.1 |
| 6,854,788 B1 * | 2/2005 | Graham | ....................... | 296/180.4 |
| 6,910,424 B2 * | 6/2005 | Ruocchio et al. | ................. | 105/3 |
| 6,932,419 B1 * | 8/2005 | McCullough | ............... | 296/180.1 |
| 6,974,178 B2 * | 12/2005 | Ortega et al. | ............... | 296/180.1 |
| 7,093,889 B2 * | 8/2006 | Graham | ....................... | 296/180.4 |
| 7,290,969 B2 * | 11/2007 | Bullock | .......................... | 410/97 |
| 7,404,592 B2 * | 7/2008 | Reiman et al. | ............. | 296/180.4 |
| 7,497,502 B2 * | 3/2009 | Wood | ........................ | 296/180.4 |
| 7,578,541 B2 * | 8/2009 | Layfield et al. | ............ | 296/180.2 |
| 7,578,546 B2 * | 8/2009 | Grady et al. | .................. | 296/191 |
| 7,604,284 B2 * | 10/2009 | Reiman et al. | ............. | 296/180.4 |
| 7,686,385 B2 * | 3/2010 | Dolan et al. | ................... | 296/191 |
| 7,740,303 B2 * | 6/2010 | Wood | ........................ | 296/180.4 |
| 7,748,772 B2 * | 7/2010 | Boivin et al. | ............... | 296/180.4 |
| 7,780,198 B2 * | 8/2010 | Taylor et al. | ................ | 280/833 |
| 7,780,224 B2 * | 8/2010 | Roush | ........................ | 296/180.4 |
| 2008/0179916 A1 * | 7/2008 | Breakfield | ................ | 296/180.4 |
| 2008/0238139 A1 * | 10/2008 | Cardolle | .................... | 296/180.4 |
| 2009/0146453 A1 * | 6/2009 | Ortega et al. | ............... | 296/180.4 |
| 2009/0189414 A1 * | 7/2009 | Boivin et al. | ............... | 296/180.4 |
| 2009/0212595 A1 * | 8/2009 | Heppel et al. | ............... | 296/180.4 |
| 2009/0212596 A1 * | 8/2009 | Reiman et al. | ............. | 296/180.4 |
| 2009/0230726 A1 * | 9/2009 | Reiman et al. | ............. | 296/180.4 |
| 2010/0066123 A1 * | 3/2010 | Ortega et al. | ............... | 296/180.4 |
| 2010/0096880 A1 * | 4/2010 | Boivin et al. | ............... | 296/180.4 |
| 2010/0096881 A1 * | 4/2010 | Boivin et al. | ............... | 296/180.4 |
| 2010/0096882 A1 * | 4/2010 | Boivin et al. | ............... | 296/180.4 |
| 2010/0096883 A1 * | 4/2010 | Boivin et al. | ............... | 296/180.4 |

* cited by examiner

*Primary Examiner* — Kiran B. Patel
(74) *Attorney, Agent, or Firm* — Liell & McNeil

(57) ABSTRACT

A truck skirting is provided for a trailer for use in tractor-trailer combinations. Skirting elements depend from both trailer sides. Braces are provided extending from the skirting elements to the trailer underside. Further, each skirting element has a longitudinal bracing bar.

8 Claims, 4 Drawing Sheets

TRUCK SKIRTING

CROSS-REFERENCE TO RELATED APPLICATIONS

Not Applicable.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.71(d)(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to tractor-trailer apparatus. More specifically, the invention relates to modification of the trailer, by application of skirting structure, to enhance stability thereof.

2. Background Art

Sullivan, U.S. Pat. No. 4,611,847, skirting is inflated and deflated for best results, for vehicle stability. Expensive, and not stable.

Ortega, U.S. Pat. No. 6,974,178, skirting is permanently attached, to deflect air from under the trailer. This patent is only of minor efficiency.

Sickler et al. U.S. Pat. No. 3,343,326, is a skirting around pre-manufactured homes or trailers, to help in stabilizing the air current and stopping its flow from under the structure.

Selby, U.S. Pat. No. 6,257,655, skirting with its ability to defray damage by passing vehicles or other ways of damage, by driving on rough roads, that in one way or another load carried without this skirting has and can have more damage to it.

Travers, U.S. Pat. No. 6,467,833, the reducing of drag on the vehicle is lessened by deflecting air at the particular area in use.

Samuelson, U.S. Pat. No. 6,789,839, is another use of deflecting air so pressure is lessened to make the different kinds of pressure from wind, what ever way to help minimize turbulence at the vehicle that its use is for.

In Graham, U.S. Pat. No. 7,093,889, bracing and all skirting is only partial, to bevel In Ruschhaupt, Jr. et al. U.S. Pat. No. Des. 330,352 the declining of skirt from front of trailer to rear of trailer makes a less drag co-efficient to a full skirt. The partial skirt is of less value than a full skirt.

The rear of the trailer is less aerodynamic and because of this, the trailer can be less secure because of resistance of unsame aerodynamics pressure from wind. From front to rear of trailer, the pivoting point of trailer is attachment to trailer of semi-truck, at front of trailer. This makes for pressure from wind at rear of trailer, dangerous for semi-truck because of leverage of trailer at rear, can cause whiplash effect on entire truck and trailer.

BRIEF SUMMARY OF THE INVENTION

A truck skirting is provided for a trailer for use in tractor-trailer combinations. Skirting elements depend from both trailer sides. Braces are provided extending from the skirting elements to the trailer underside. Further, each skirting element has a longitudinal bracing bar.

Other objects, advantages, and novel features of the present invention will become apparent from the following detailed description of the invention when considered in conjunction with the accompanying drawings.

DETAILED DESCRIPTION OF THE INVENTION

Figure 1:
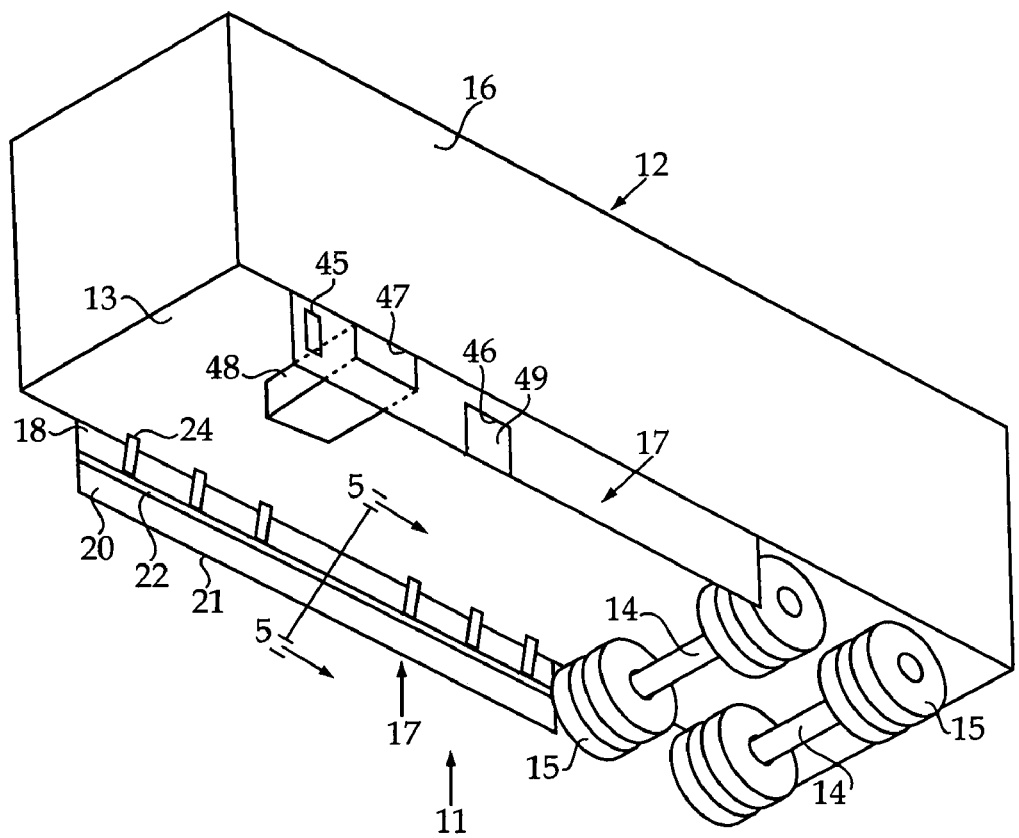
FIG. 1 is a perspective view from the front of the trailer showing the underside having the skirt and its bracing.
Figure 2:
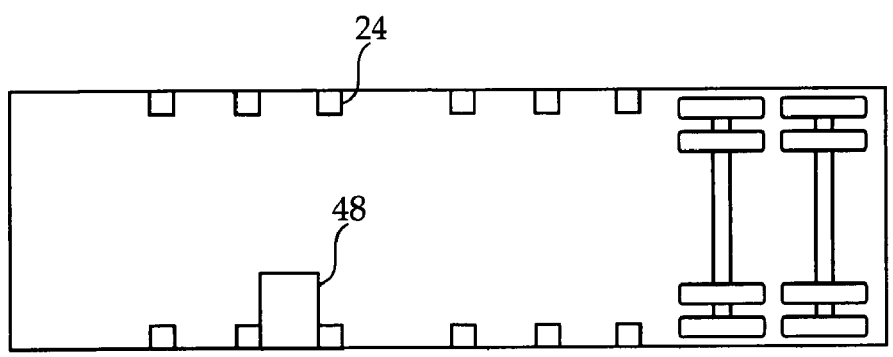
FIG. 2 is a bottom plan view of the trailer with skirting and bracing.

The truck skirting of this invention is shown generally at 11 in FIG. 1. The truck skirting (11) is deployed on a trailer (12), more specifically to the underside (13) forward of the tandem axles (14) and wheels (15). The trailer (12) typically has parallel sidewalls (16) extending upwardly from the longitudinal edges of the underside (13).

The truck skirting (11) more specifically includes a pair of elongated sheets (17) extending downwardly from the longitudinal edges of underside (13). Preferably the sidewalls (16) and sheets (17) form a continuously smooth side surface for the trailer (12).

Figure 5:
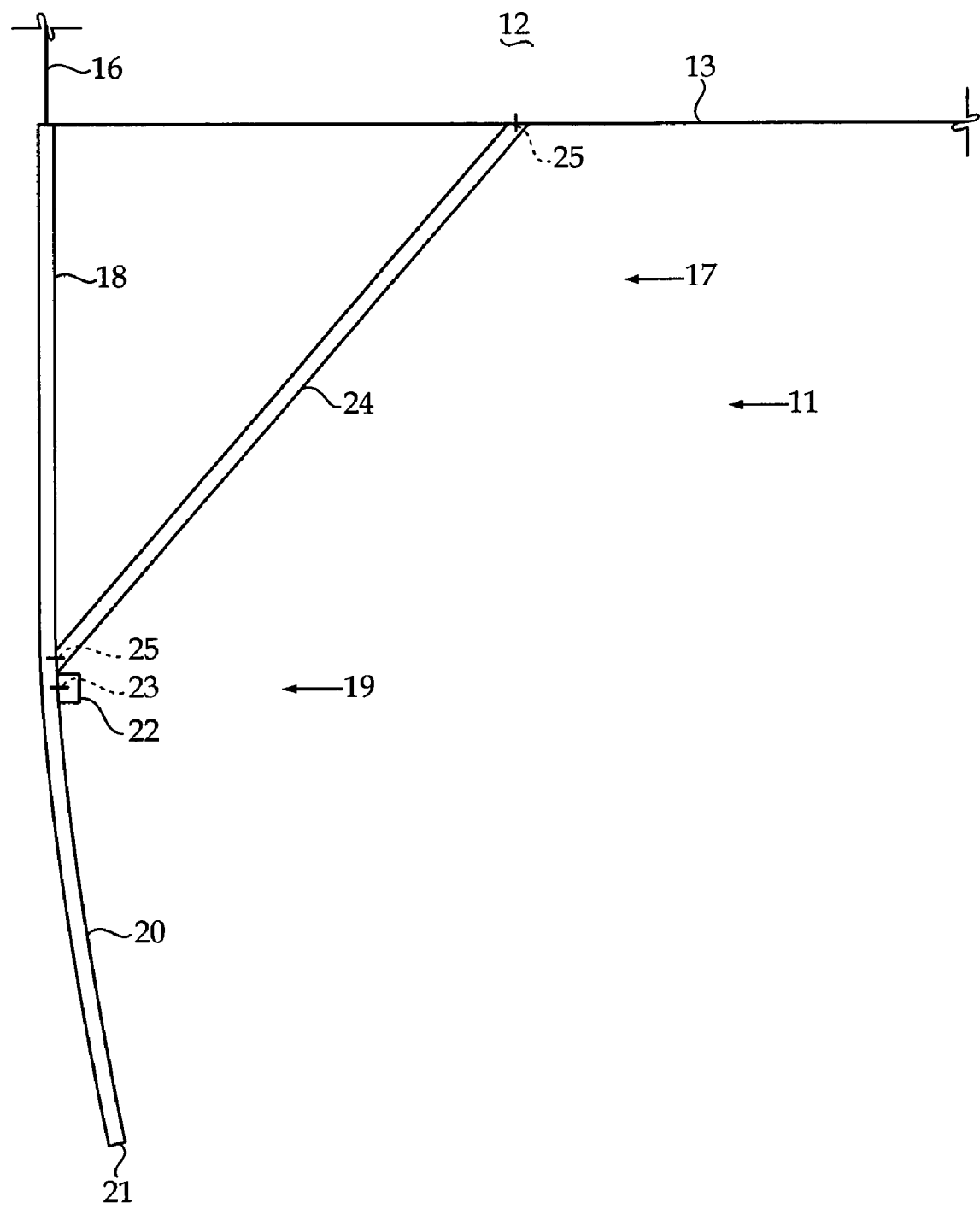
FIG. 5 is an enlarged, fragmentary view along line 5-5 of FIG. 4 showing the skirt and bracing.

Referring to FIG. 5, each sheet (17) includes a first portion (18) which depends from underside (13), extending to a bend area or crease (19) from which a second portion (20) depends at a modest angle with respect to the plane of the first portion (18). The portion (20) terminates in a lower end edge (21). The lower end edge (21) preferably has 7 to 8 inches ground clearance.

The sheets (17) preferably are composed of sheet metal. However, a formed plastic sheet also could be employed.

The truck skirting (11) further includes elongated flat bars (22) which extend the length of the sheets (17) and are fixed to the bend areas (19) such as by screws (23). A plurality of longitudinally spaced apart angle braces (24) extend from the underside (13) to each sheet (17) at the bend area (19) adjacent the flat bar (22). The braces (24) are affixed such as by screws (25).

Flat bars (22) and braces (24) preferably are of chemically treated wood.

Figure 3:
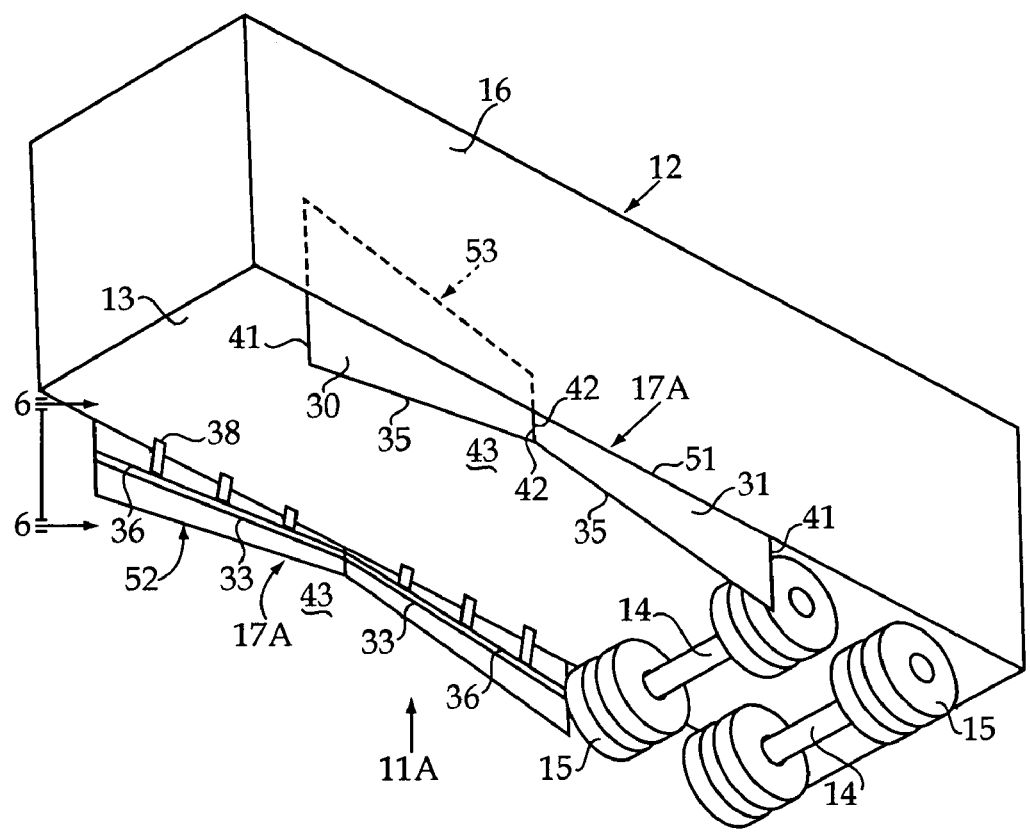
FIG. 3 is a perspective view from the front of the trailer showing the underside having the upside down V skirting and bracing.
Figure 4:
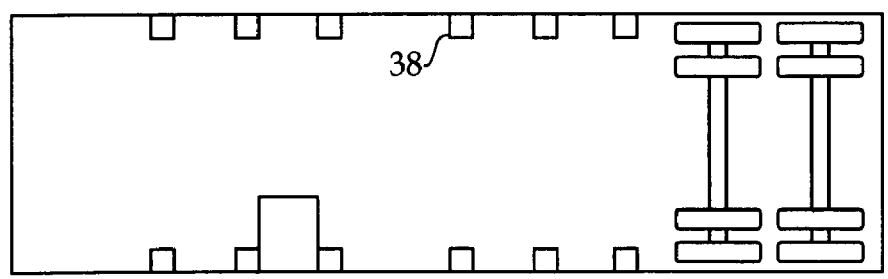
FIG. 4 is a bottom plan view of the trailer with the upside down V skirting and bracing.

A preferred embodiment of the truck skirting is shown at 11A in FIG. 3. Alternate sheets (17A) are comprised of forward and rearward parts (30, 31).

Figure 6:
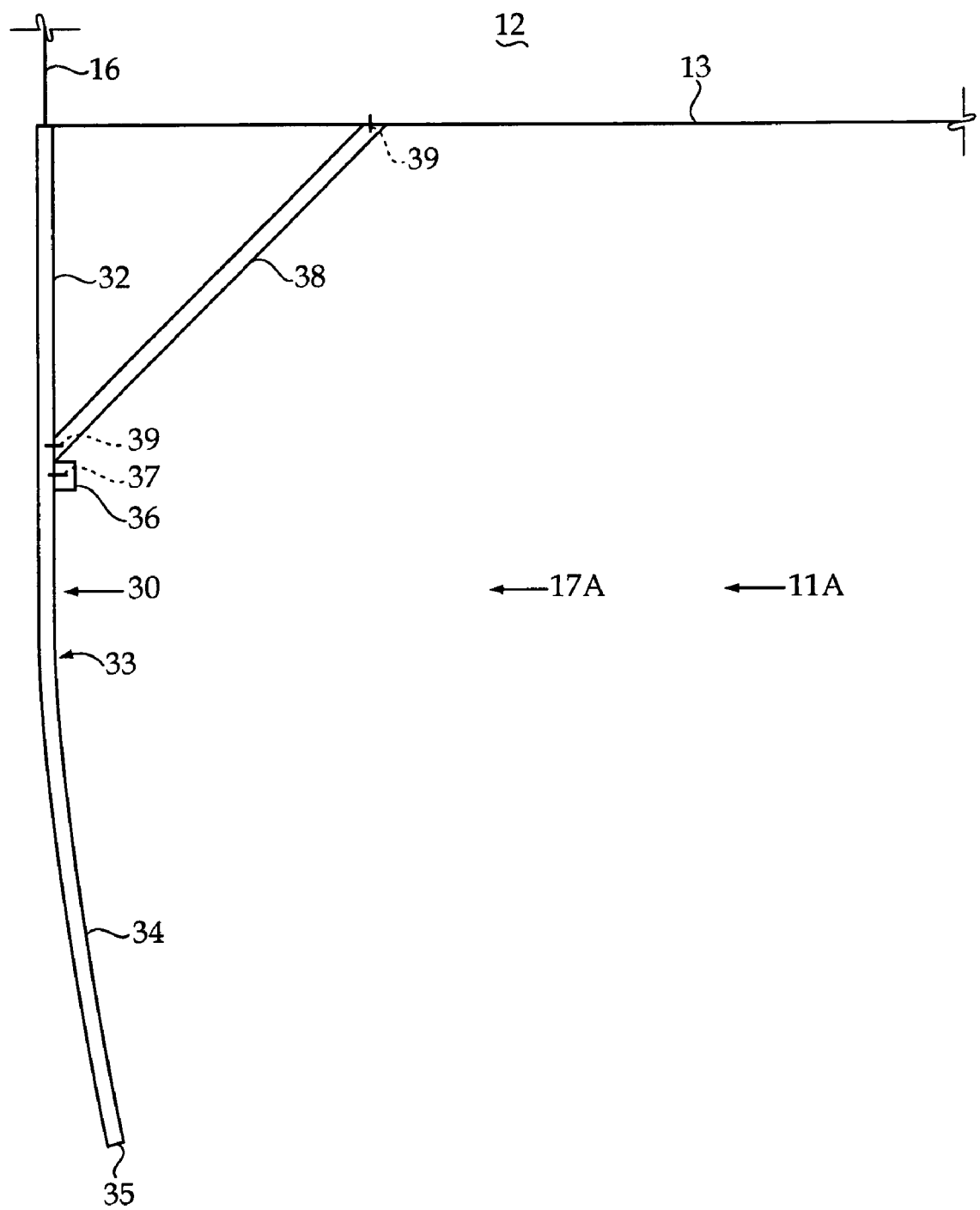
FIG. 6 is an enlarged, fragmentary view along line 6-6 of FIG. 4 showing alternate skirt and bracing.

Referring also to FIG. 6, each part (30, 31) includes a first portion (32) which depends from underside (13), extending to a bend area or crease (33) from which a second portion (34) depends at a modest angle with respect to the plane of the first portion (32). The second portion (34) terminates in a lower end edge (35).

The truck skirting (11A) further includes flat bar portions (36) which extend the length of the forward and rearward parts (30, 31). The bar portions (36) are fixed, such as by screws (37), to the first portions (32) above the bend area (33). A plurality of longitudinally spaced apart angle braces (38) extend from the underside (13) to each portion (32) adjacent the bar portions (36). The braces (38) are fixed such as by screws (39).

The forward and rearward parts (30, 31) each have a relatively longer vertical edge (41) and relatively shorter vertical edge (42). The lower end edges (35) therefore taper from edge (41) to edge (42). The shorter edges (42) butt together. The sheets (17A) therefore have lower end edges (35) forming an inverted-V area (43). The bar portions (36) and bend areas (33) are parallel to the lower end edges (35). The braces (38) have variable lengths. The forward and rearward parts (30, 31) at the longer vertical edges (41) preferably have 7-8 inches ground clearance. The inverted-V area (43) preferably is approximately 8 inches deep with respect to the tips of edges (41).

The truck skirting attachments are to the bottom (13), or sides (16) of trailer (12). The skirting (11, 11A) extends from the rear of the tractor (not shown)/front of the trailer (12) to the front of the rear tires (14, 15) on the trailer (12). Attachment can be made, with differences in wheel bases, skirting can be in between and also behind the rear wheels/dual tires (14, 15) on the trailer (12).

The upside down V skirting (11A) inclines towards the middle of the trailer (12) from its front and rear. This is to help in the parking of the semi truck so that on a downhill grade, the skirting (11A) does not come in contact with the surface it is riding on. In particular, many warehouse facilities have only a ground floor. Depressions or pits are formed into the floor, the pits having a downwardly sloped surface, terminating at a vertical end wall, the ground floor area adjacent this end wall effectively serving as a "loading/unloading dock" area. The skirting (11A) facilitates backing the trailer (12) down into the pit and back to the vertical end wall.

An alternative is pivotal attachment (51) of forward and rearward parts (30, 31) to the longitudinal edges of underside (13). The skirting (11A) fastens in the down position (52) when going down the road and in the up position (53) when maneuvering inside a warehouse.

There is a slot (45) in the skirting (11) for the trailer handle (not shown), which raises and lowers the trailer (12) for parking and unloading, with detachment of the trailer (12) from the tractor (not shown), and allows re-attachment of the trailer (12) to the tractor. Wind striking the sides and underneath of the trailer (12) creates pressure with the forward motion wind of the truck. This then creates hydroplaning of the semi and roll-over is created by these two wind forces. With these skirts (11, 11A), and the tractor's aerodynamics, the roll-over probability of the semi is lessened. Fattening of these skirts is to the side, or bottom of the trailer. Then there are accessible openings (46) for getting to the underside of the trailer for maintenance purposes. Opening (47) is provided aligned with underside storage bracket structure (48) to receive a spare wheel. These openings (45, 46, 47) are covered by sheet metal (49), with permanent nuts attached to the back side of the permanent skirt. With removal or placement of these plates (49), bolts are inserted from the front for easy use.

The industrial applicability of the truck skirting invention (11) is believed to be apparent from the foregoing description. Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover both equivalent structures and structural equivalents of the structures described herein as performing the claimed function.

I claim:

1. A skirting, for use with a trailer, comprising:
   first skirt element depending from the trailer, and including a first elongated sheet forming a continuous smooth side surface for the trailer and having a first outer surface, a first inner surface, and a first bottom edge which forms an inverted V and adjoins the first inner surface and the first outer surface;
   second skirt element, depending from the trailer and spaced apart from said first skirt element, said second skirt element including a second elongated sheet also forming a continuously smooth side surface for the trailer and having a second outer surface, a second inner surface, and a second bottom edge which forms an inverted V and adjoins the second inner surface and the second outer surface;
   said first and second elongated sheets each having a ground clearance extending in a first direction from the respective bottom edges, and wherein a second clearance extends in a second direction normal to the first direction from the first inner surface to the second inner surface;
   first bracing bar disposed on said first skirt, said first bracing bar having forward and rearward members joined to form an inverted V; and
   second bracing bar disposed on said second skirt, said second bracing bar having forward and rearward members joined to form an inverted V.

2. The skirting of claim 1, wherein at least one of said skirt elements has at least one opening formed therethrough.

3. The skirting of claim 2, wherein said opening is adapted to receive a trailer handle.

4. The skirting of claim 2, wherein said opening is adapted to receive a maintenance person.

5. The skirting of claim 2, wherein said opening is associated with a space wheel holder.

6. The skirting of claim 1, wherein said skirt elements are pivotally attached to the trailer.

7. The skirting of claim 1, wherein each of said skirt elements includes an upper portion depending from the trailer, a lower portion, and a crease between the respective upper and lower portions such that the lower portion depends at an angle with respect to a plane of the first portion and toward a longitudinal centerline of the trailer.

8. The skirting of claim 7 wherein the crease of each skirt element is parallel the corresponding bottom edge.

* * * * *